United States Patent
Sun

(10) Patent No.: US 11,654,521 B2
(45) Date of Patent: May 23, 2023

(54) TOOL MACHINE MAGAZINE

(71) Applicant: Chen Sound Industrial Co., Ltd., Taichung (TW)

(72) Inventor: Ying Sun, Taichung (TW)

(73) Assignee: CHEN SOUND INDUSTRIAL CO., LTD., Taichung (TW)

( * ) Notice: Subject to any disclaimer, the term of this patent is extended or adjusted under 35 U.S.C. 154(b) by 0 days.

(21) Appl. No.: 17/340,208

(22) Filed: Jun. 7, 2021

(65) Prior Publication Data

US 2021/0379713 A1  Dec. 9, 2021

(30) Foreign Application Priority Data

Jun. 9, 2020 (TW) ................................ 109119361

(51) Int. Cl.
*B23Q 3/157* (2006.01)
*B23Q 3/155* (2006.01)

(52) U.S. Cl.
CPC ...... *B23Q 3/15722* (2016.11); *B23Q 3/15526* (2013.01); *Y10T 29/5167* (2015.01); *Y10T 74/1494* (2015.01); *Y10T 483/1882* (2015.01)

(58) Field of Classification Search
CPC ........... Y10T 483/179; Y10T 483/1793; Y10T 483/1795; Y10T 483/1873; Y10T 483/1882; Y10T 29/5165; Y10T 29/5166; Y10T 29/5167; Y10T 74/1494; B23Q 3/15526; B23Q 3/15534; B23Q 3/15722
USPC ......... 483/54, 55, 56, 66, 67; 29/48.5 A, 49, 29/48.5 R; 74/813 L
See application file for complete search history.

(56) References Cited

U.S. PATENT DOCUMENTS

| | | | | |
|---|---|---|---|---|
| 4,827,600 | A * | 5/1989 | Miyano | B23Q 3/15706 483/57 |
| 7,387,600 | B1 * | 6/2008 | Sun | B23Q 3/15706 483/39 |
| 2012/0241342 | A1 * | 9/2012 | Sun | B23Q 3/15534 483/42 |
| 2013/0345034 | A1 * | 12/2013 | Liu | B23Q 3/15534 483/38 |

FOREIGN PATENT DOCUMENTS

| | | | | |
|---|---|---|---|---|
| CN | 105988413 A | * | 10/2016 | |
| CN | 112059621 A | * | 12/2020 | |
| JP | S56110764 U | * | 8/1981 | |
| JP | 2002059330 A | * | 2/2002 | |
| JP | 2012187668 A | * | 10/2012 | ......... B23Q 3/15513 |
| TW | 201350255 A | * | 12/2013 | ......... B23Q 3/15513 |

* cited by examiner

*Primary Examiner* — Boyer D Ashley
*Assistant Examiner* — Michael Vitale
(74) *Attorney, Agent, or Firm* — Muncy, Geissler, Olds & Lowe, P.C.

(57) ABSTRACT

A tool machine magazine includes a base, a tool disc disposed on the base, tool sleeves disposed on a periphery of the tool disc through a bearing, a motor, a brake structure, a cam, a driver shaft, an angle sensor, and a control terminal. The motor drives the cam to operate. Each bearing orderly operates along the outline of the cam, driving the tool disc to continuously rotate without intermittence. The angle sensor is disposed on one end of the driver shaft or a rotation center of the tool disc. When the rotation angle of the tool disc matches the tool change command, the control terminal controls the brake structure to stop the motor, so as to stop the tool disc for facilitating the tool change operation.

8 Claims, 8 Drawing Sheets

TOOL MACHINE MAGAZINE

BACKGROUND OF THE INVENTION

1. Field of the Invention

The present invention relates to tool machine magazines, and more particularly, to a tool magazine capable of accurately controlling the smooth rotation of the tool disk.

2. Description of the Related Art

The tool disc driving structure for tool magazine of conventional tool machines comprises a tool change mechanism and a tool magazine. The tool magazine comprises a rotation disc and a rotating tool disc, and the rotation disc is connected with the rotating tool disc. Therein, the power source for driving the rotating tool disc to rotate is generally divided into a regular motor and a servomotor.

When the power source for driving the rotating tool disc to rotate is a regular motor, the rotation disc comprises a roller pillar, and the rotation shaft of the regular motor is connected with a cam. With the current from the power source is inputted into the coil of the regular motor, the regular motor drives the cam to rotate, such that the roller pillar of the rotation disc operates along the outline of the cam, thereby driving the rotating tool disc to operate. When the regular motor is to be stopped, the current from the power source is immediately stopped from being inputted into the coil. However, due to the rotation inertia, the rotation shaft of the regular motor is difficult to be immediately stopped, and the temporary rotation of the rotation shaft causes the rotating tool disc to temporarily waver. As a result, the rotating tool disc cannot stop at the appropriate position. Therefore, for stopping the rotating tool disc at the appropriate position, an idling design is imposed on two ends of the outline of the cam. When the regular motor stops operating, the roller pillar is affected by the outline of the cam, whereby the rotating tool disc stops rotating at the idling part of the cam. Also due to the idling design of the cam, the rotating tool disc generates an intermittent exercise between the static and rotating statuses.

However, the intermittent exercise hinders the smooth rotation of the rotating tool disc. Also, the rotation speed of the rotating tool disc is limited. If the distance between the used tool and the target tool is relatively long, the time duration for the tool change operation becomes longer, causing a reduced tool change efficiency.

For improving the intermittent exercise issue of the rotating tool disc when driving the camp to rotate with a regular motor, a servomotor is applied for controlling the rotation of the rotating tool disc. Therein, the servomotor comprises an encoder, which can acquire the rotation angle of the rotating tool disc. According to the rotation angle acquired by the encoder, the servomotor identifies the rotation or stop of the rotating tool disc.

However, there are multiple elements on the power transmission path between the rotating tool disc and the servomotor. After a long period of usage, the elements are easily worn, causing errors of the rotation angle detected by the encoder, such that the servomotor is unable to accurately control the rotating tool disc, resulting in a tool change operation failure. Also, the cost of the servomotor is relatively higher. When the servomotor is damaged, the maintenance fee and time are also higher, increasing the overall cost of the tool machine.

SUMMARY OF THE INVENTION

To improve the issues above, the present invention discloses a tool machine magazine. The present invention accurately detects the rotation angle of the tool disc with the angle sensor, and the brake structure accurate stops the tool disc at the desirable angle, thereby enhancing the tool change operation efficiency.

A tool machine magazine in accordance with an embodiment of the present invention comprises:
a base;
a tool disc disposed on the base;
a plurality of tool sleeves disposed on a periphery of the tool disc through a bearing for receiving a tool thereon, respectively; and
a driver device comprising a motor, a brake structure, a cam, a driver shaft, an angle sensor, and a control terminal, the brake structure disposed in the motor, the motor driving the cam to operate, each bearing contacting an outline of the cam, each bearing orderly operating along the outline of the cam, so as to drive the tool disc to continuously rotate without intermittence; the angle sensor disposed on one end of the driver shaft or a rotation center of the tool disc, the angle sensor sensing a rotation angle of the tool disc, the control terminal receiving the rotation angle and a tool change command; wherein when the control terminal identifies that the rotation angle matches the tool change command, the control terminal controls the brake structure to stop an operation of the motor, thereby stopping the tool disc from rotating for carrying out a tool change operation.

With such configuration, the present invention accurately senses the rotation angle of the tool disc with the angle sensor, so that the control terminal controls the brake structure to stop the rotation of the tool disc. Therefore, the present invention facilitates an accurate tool change operation and prevents accidental rotation accident of the tool disc.

Also, the angle sensor is installed on one end of the driver shaft or the rotation center of the tool disc, so as to prevent the wearing of the elements from affecting the detection accuracy of the rotation angle, thereby effectively improve the measuring accuracy of the angle sensor.

In addition, the structure of the present invention serves a control function similar to that of a servomotor, thereby reducing the manufacturing and maintenance cost.

Furthermore, with each bearing orderly operating along the outline of the cam, the present invention drives the tool disc to continuous operate without intermittence. Therefore, the tool disc operates smoothly, and the operation time is saved, so as to improve the issue of a hindered and slow rotation of the rotating tool disc, enhancing the efficiency of the tool change operation.

DETAILED DESCRIPTION OF THE INVENTION

Figure 1:
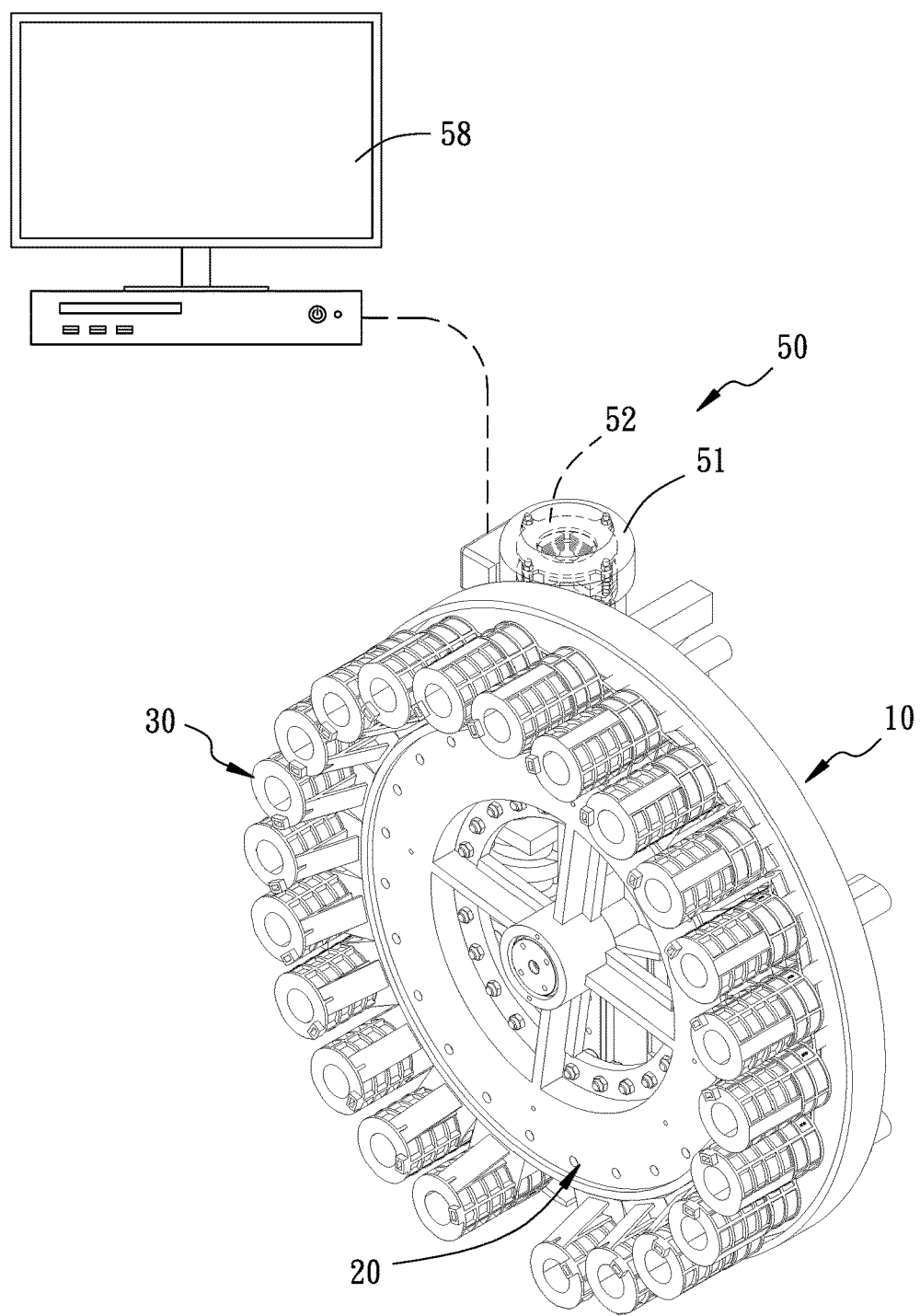
FIG. 1 is a perspective view of the tool magazine in accordance with the first embodiment of the present invention.

The aforementioned and further advantages and features of the present invention will be understood by reference to the description of the preferred embodiment in conjunction with the accompanying drawings where the components are illustrated based on a proportion for explanation but not subject to the actual component proportion.

Referring to FIG. 1 to FIG. 8, a tool machine magazine in accordance with an embodiment of the present invention comprises a base 10, a tool disc 20, a plurality of tool sleeves 30, a plurality of bearings 40, and a driver device 50.

The base 10 is configured to be disposed on a tool machine (not shown). The base 10 is shaped in an approximate circular plate. The base 10 comprises a first lateral face 11 and a second lateral face 12. An installation portion 13 is disposed on the second lateral face 12 of the base 10 and protrudes at the center of the base 10. A contain portion 14 passes through the base 10 and is positioned on one lateral side of the installation portion 13.

The tool disc 20 has a central shaft 21 at the rotation center thereof. The tool disc 20 is disposed on the installation portion 13 of the base 10 through the central shaft 21.

The tool sleeves 30 are arranged around the tool disc 20 and disposed on the periphery of the tool disc 20. In the embodiment of the present invention, the tool sleeves 30 are disposed on the periphery of the tool disc 20 at equal angles therebetween. Each tool sleeve 30 is configured to receive a tool (not shown) inserted thereon.

The bearings 40 are disposed on the tool disc 20 in a circular arrangement. In the embodiment of the present invention, the bearings 40 are disposed on the periphery of the tool disc 20 at equal angles therebetween, wherein each bearing 40 corresponds to a tool sleeve 30, and the bearings 40 are disposed around the central shaft 21 and arranged between the corresponding tool sleeve 30 and the central shaft 21.

The driver device 50 comprises a motor 51, a brake structure 52, a cam 53, a driver shaft 54, a first gear 55, a second gear 56, an angle sensor 57, and a control terminal 58. The brake structure 52 is disposed in the motor 51. The motor 51 and the cam 53 are disposed on the base 10. The motor 51 is arranged on the first lateral face 11 of the base 10. The cam 53 is disposed in the contain portion 14 of the base 10. The first gear 55 is mounted around the rotation shaft of the motor 51. The second gear 56 and the cam 53 are mounted around the driver shaft 54. The first gear 55 is engaged with the second gear 56, such that the driver shaft 54 drives the cam 53 to rotate about the axial direction of the driver shaft 54. In the embodiment of the present invention, the motor 51 is a deceleration motor.

The brake structure 52 is mounted around the rotation shaft of the motor 51. The brake structure 52 comprises a bottom seat 521, an electromagnetic set 522, a lining 523, a magnetic conductive plate 524, a plurality of pressure springs 525, a bushing 526, a plurality of studs 527, a plurality of pressure adjustment members 528, and a plurality of gap adjustment members 529. The bottom seat 521 is disposed along the axial direction of the motor 51. The magnetic conductive plate 524 and the electromagnetic set 522 are combined to the bottom seat 521 through the studs 527. The pressure adjustment members 528 and the gap adjustment members 529 are screwedly disposed on the corresponding studs 527. Also, each pressure adjustment member 528 is arranged between each pressure spring 525 and the electromagnetic set 522, and each gap adjustment member 529 is screwedly disposed on two lateral sides of the electromagnetic set 522.

The bushing 526 is disposed between the lining 523 and the rotation shaft of the motor 51. The lining 523 is slidably disposed on the outer edge of the bushing 526. In the embodiment of the present invention, the outer edge of the bushing 526 is formed in an approximate rectangular shape, with a circular bore formed at the center of the bushing 526, through which the rotation shaft of the motor 51 passes.

Also, the electromagnetic set 522 comprises an electromagnetic wire 522a and an electromagnetic coil 522b. When the electromagnetic wire 522a of the electromagnetic set 522 is electrically conducted, the electromagnetic coil 522b generates a magnetic field. The magnetic conductive plate 524 is attracted by the electromagnetic coil 522b of the electromagnetic set 522, such that the magnetic conductive plate 524 moves away from the lining 523, and the motor 51 drives the cam 53 to operate. Therein, the magnetic conductive plate 524 presses each pressure spring 525, so that each pressure spring 525 enters a compression status.

When the conduction of the electromagnetic wire 522a of the electromagnetic set 522 is cut, the magnetic field of the electromagnetic coil 522b disappears, and the magnetic conductive plate 524 is no longer attracted by the magnetism of the electromagnetic coil 522b. The expanding force of each pressure spring 525 pushes the magnetic conductive plate 524 to cause the friction between the magnetic conductive plate 524 and the lining 523. The rotation shaft of the motor 51 is pressed by the lining 523 to stop rotation.

The motor 51 drives the cam 53 to operate. Each bearing 40 respectively contacts the outline 531 of the cam 53. Each bearing 40 operates orderly along the outline 531 of the cam 53, so as to drive the tool disc 20 to continuously rotate without intermittence. In the embodiment of the present invention, the cam 53 is a column shaped constant-velocity cam. The outline 531 of the cam 53 is formed on the periphery of the cam 53. Each bearing 40 is allowed to cooperate with the outline 531.

Further, the angle sensor 57 is applied for sensing a rotation angle of the tool disc 20. The angle sensor 57 is disposed on the power transmission path between the tool disc 20 and the cam 53. Therein, the angle sensor 57 is able to be disposed on an end of the driver shaft 54 or the tool disc 20. Referring to FIG. 2, FIG. 3, FIG. 6, and FIG. 7, in the first and the second embodiments of the present invention, the angle sensor 57 is disposed on one end of the driver shaft 54. The cam 53 is disposed between the second gear 56 and the angle sensor 57. Referring to FIG. 8, in the third embodiment of the present invention, the angle sensor 57 is disposed on the rotation center the tool disc 20.

Figure 2:
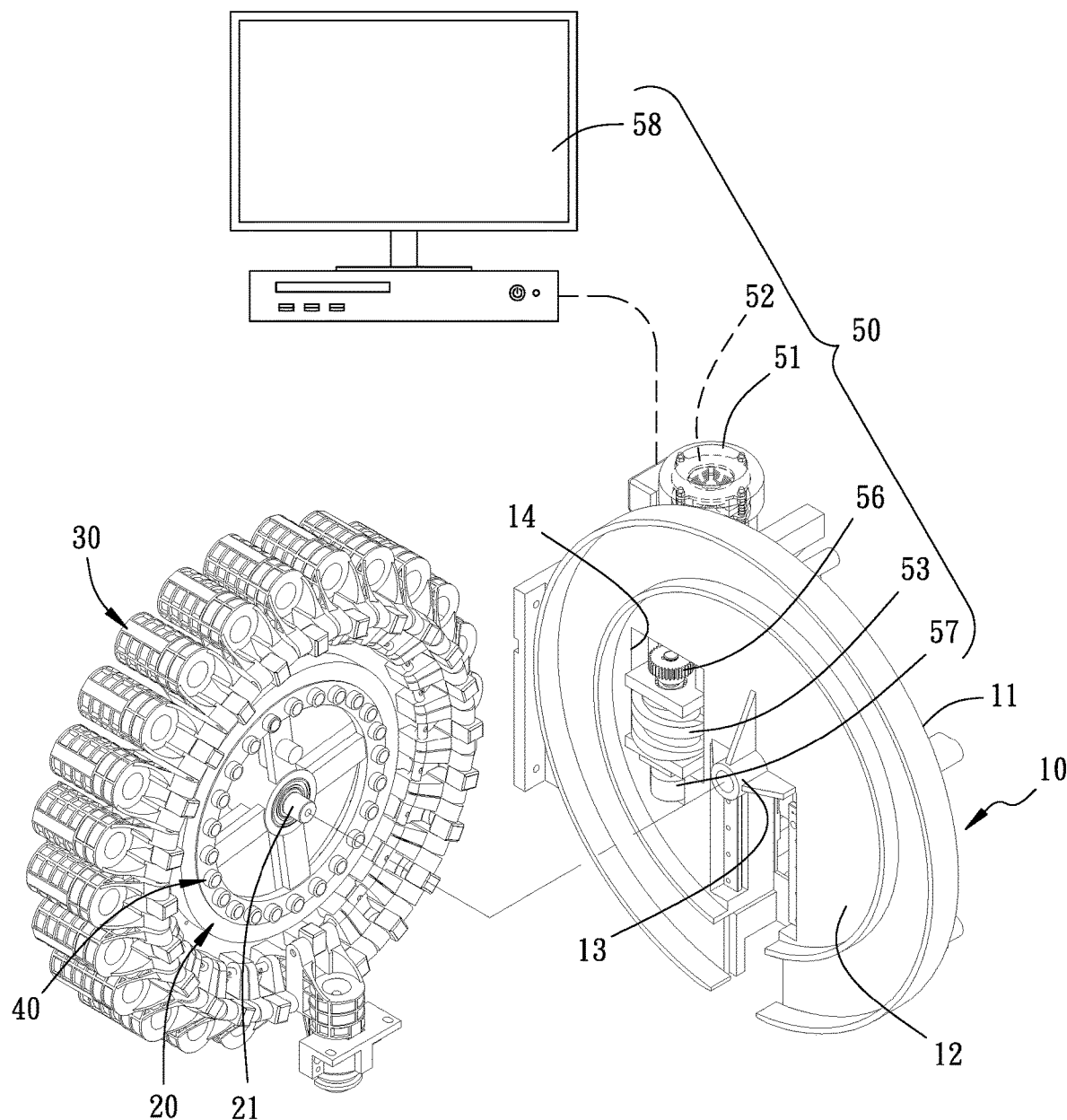
FIG. 2 is an exploded view of the tool magazine in accordance with the first embodiment of the present invention.
Figure 3:
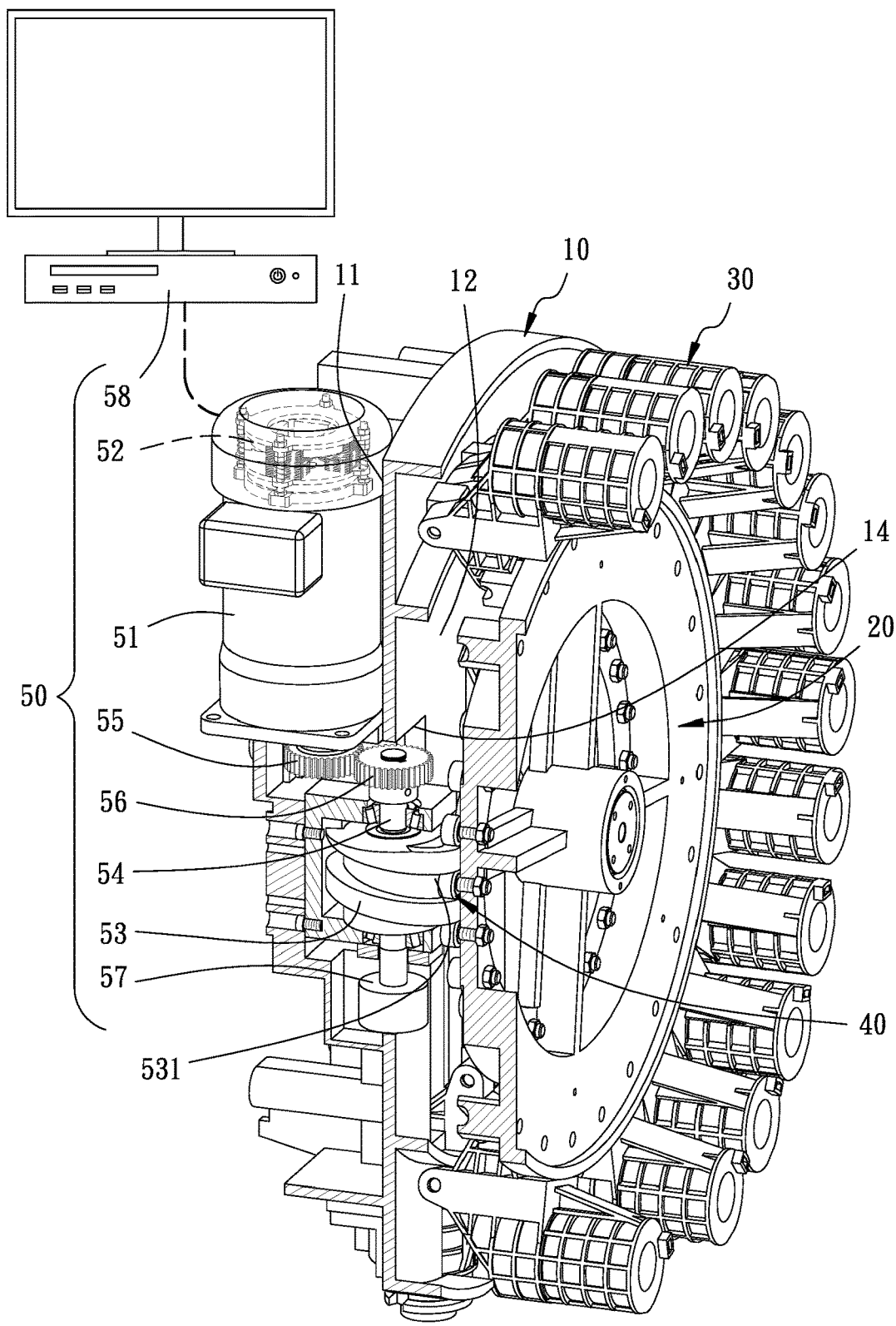
FIG. 3 is a partially sectional view of the tool magazine in accordance with the first embodiment of the present invention.
Figure 4:
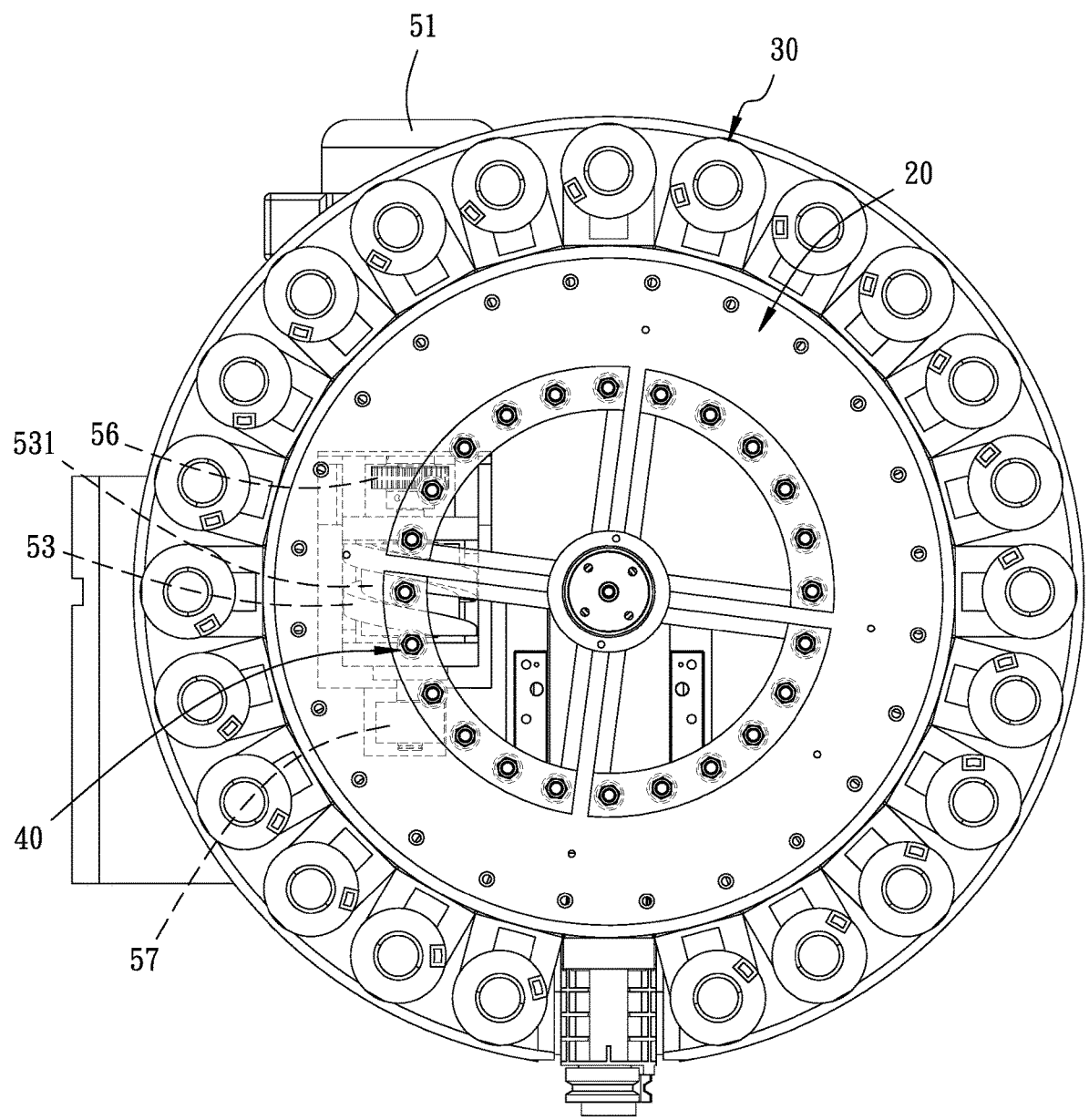
FIG. 4 is a schematic view illustrating the operation of the tool magazine in accordance with the first embodiment of the present invention.
Figure 5:
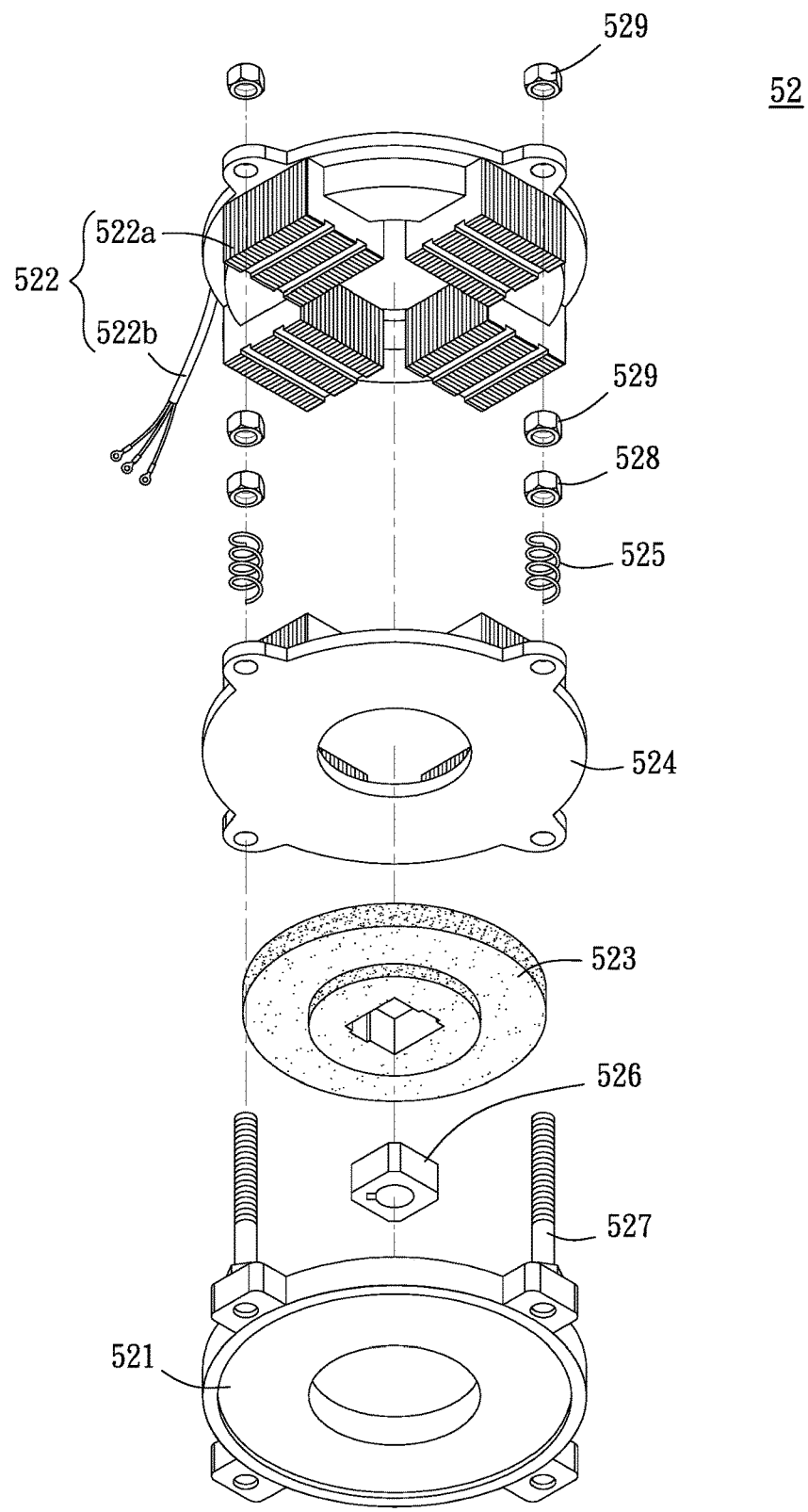
FIG. 5 is an exploded view of the brake structure in accordance with the first embodiment of the present invention.

The angle sensor 57 is allowed to be an encoder or an inductive sensor. Referring to FIG. 2 and FIG. 3, in the first and the third embodiments of the present invention, the angle sensor 57 is allowed to be an encoder.

Figure 6:
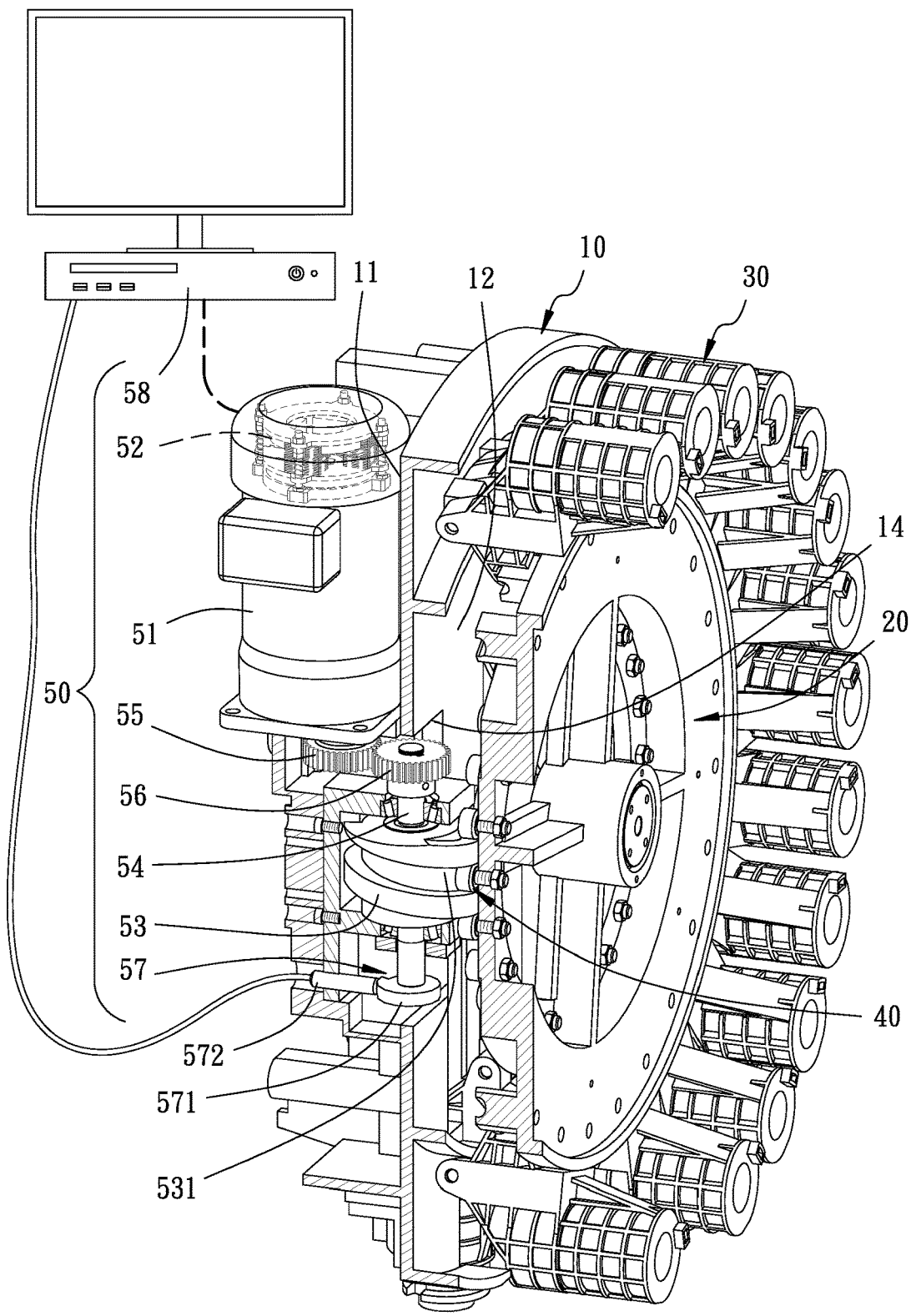
FIG. 6 is a partially sectional view of the tool magazine in accordance with the second embodiment of the present invention.
Figure 7:
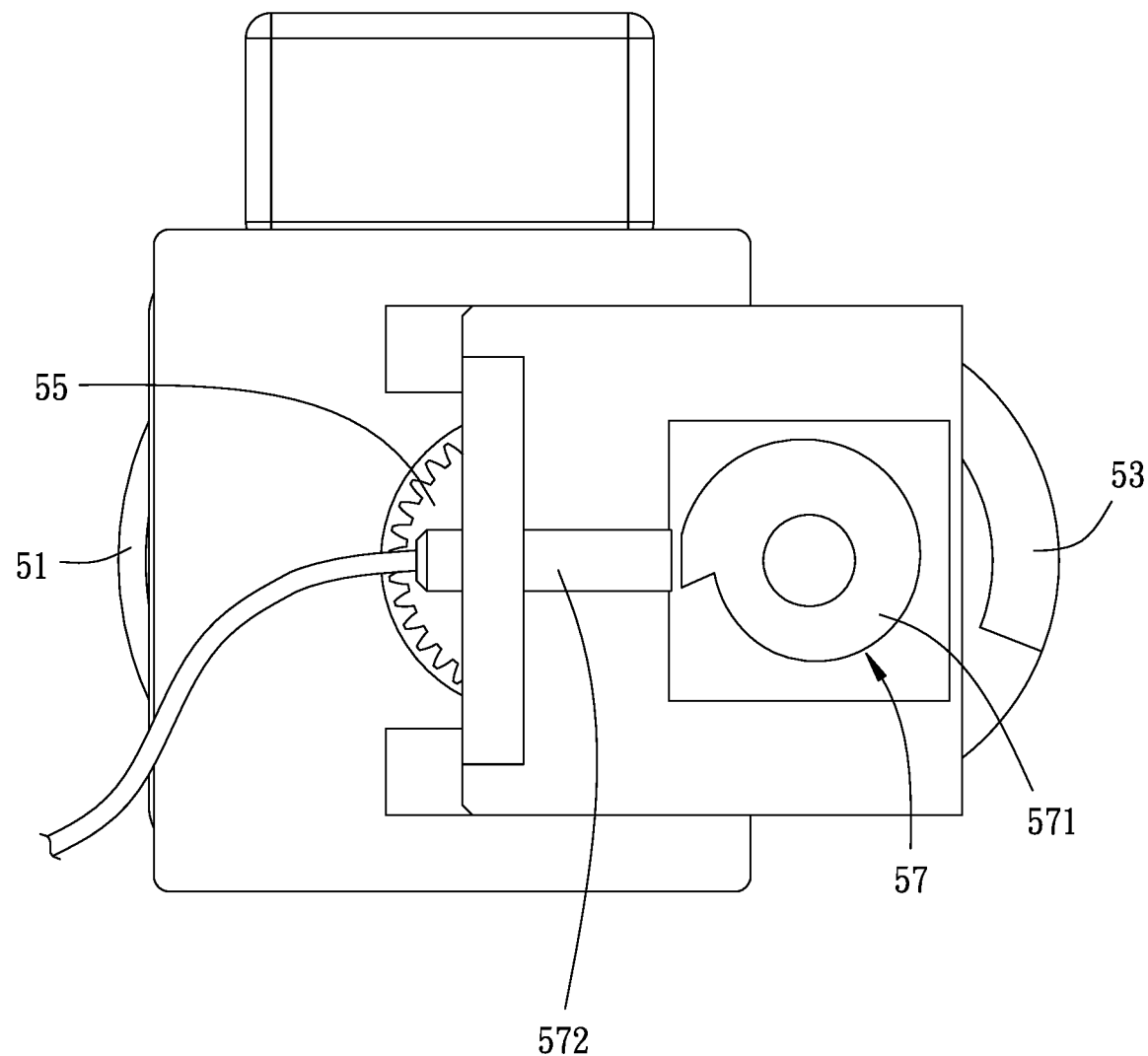
FIG. 7 is a partially enlarged schematic view in accordance with the second embodiment of the present invention.
Figure 8:
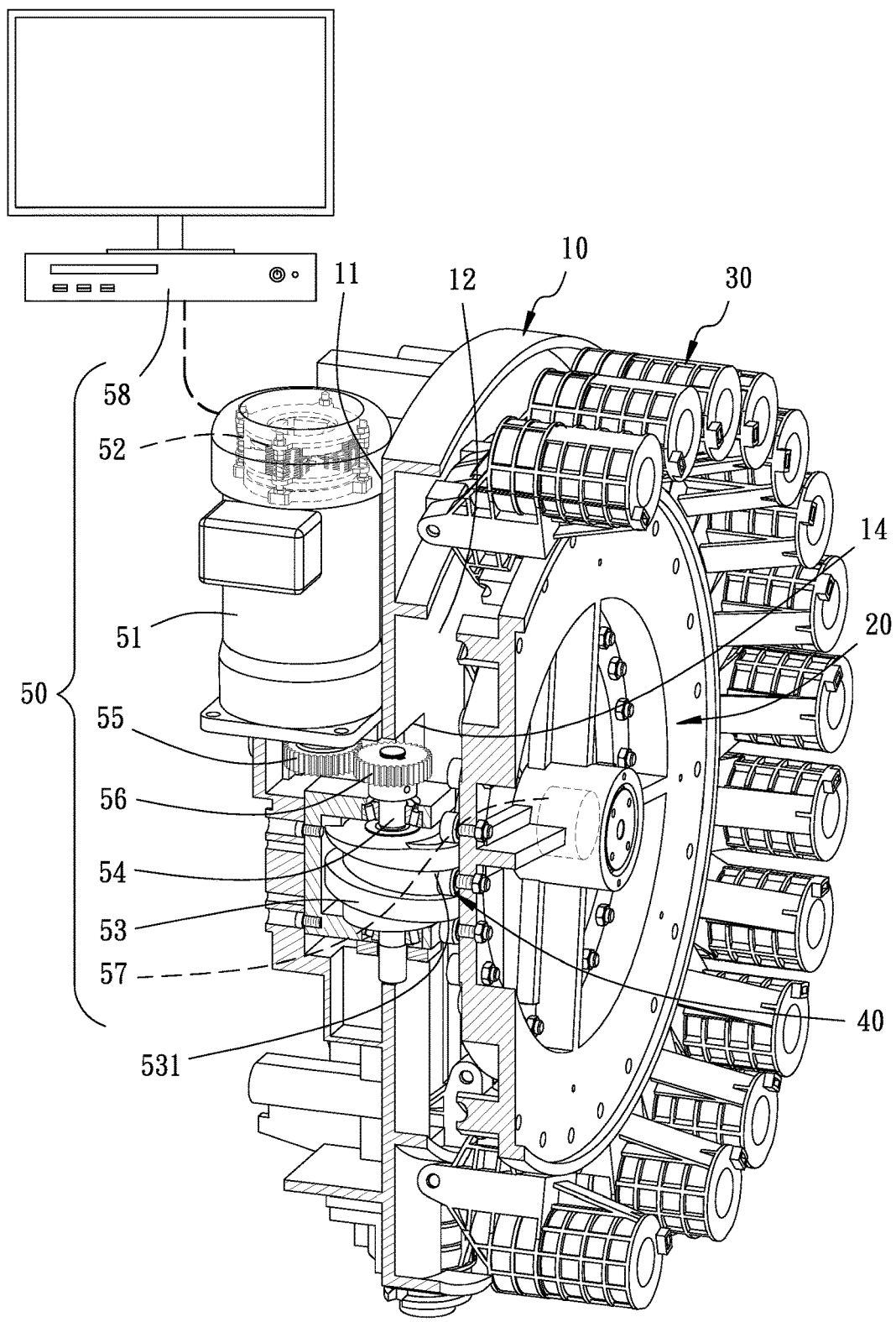
FIG. 8 is a partially sectional view of the tool magazine in accordance with the third embodiment of the present invention.

Referring to FIG. 6 and FIG. 7, in the second embodiment of the present invention, the angle sensor 57 is an inductive sensor. The angle sensor 57 comprises a sense block 571 and a sense module 572. The sense block 571 is mounted around one end of the driver shaft 54. The sense block 571 and the sense module 572 are spaced. The outer periphery of the sense block 571 is formed in an approximate arc shape curve, and the track of the arc shape curve expands to form an involute. The sense end of the sense module 572 faces toward the outer periphery of the sense block 571. Different positions on the outer periphery of the sense block 571 are spaced away from the sense end by different distances. The sense module 572 detects such distances with respect to the sense block 571 to generate a distance signal. The control terminal 58 receives the distance signal and processes the distance signal to acquire the rotation angle of the tool disc 20.

In the embodiment, the sense end of the sense module 572 projects a light beam to the outer periphery of the sense block 571. By use of the light beam, the sense module 572 detects the distance with respect to the outer periphery of the sense block 571. The sense module 572 outputs the distance signal to the control terminal 58 as a voltage value. The voltage variation of the sense module 572 ranges from 1 to 30 volts. The control terminal 58 stores voltage values corresponding to different distances, and the outer periphery of the sense block 571 is divided into 360 degrees based on the voltage intervals. For example, a full 360-degree rotation of the sense block 571 represents one tool position; 1 volt represents a 0-degree rotation angle of the tool disc 20; 26.25 volts represents a 315-degree rotation angle of the tool disc 20. Such examples are only for illustration, with no intention of limiting the present invention.

The control terminal 58 is coupled with the motor 51, wherein the control terminal 58 is allowed to be a computer. However, the forms of the control terminal 58 are not limited in the present invention. The control terminal 58 stores a relative position angle by which each tool sleeve 30 is disposed on the tool disc 20.

During the process of the driver device 50 controlling the tool disc 20 to rotate, the angle sensor 57 continuously sense the current rotation angle of the tool disc 20 without intermittence, and the angle sensor 57 continuously transmits the rotation angles to the control terminal 58. When the control terminal 58 receives a tool change command, it is indicated that a tool change operation is to be carried out, and the tool of one of the tool sleeves 30 is to be taken out. The tool change command represents the tool sleeve 30 of a target tool. The control terminal 58 reads the corresponding position angle of the tool sleeve 30 on which the target tool is installed, and compares the read position angle with the rotation angle currently received. When the control terminal 58 identifies that the rotation angle matches the tool change command, the control terminal 58 operates the brake structure 52, which then controls the motor 51 to stop, whereby the tool disc 20 stops rotating for facilitating the tool change operation.

If the tool sleeve 30 of the target tool has a relatively greater distance with respect to the current rotation angle of the tool disc 20, with the continuous rotation without intermittence, the present invention is able to efficiently rotate to the desirable rotation angle, and accurately stops the rotation of the tool disc 20 with the brake structure 52, thereby facilitating the tool change operation.

With the foregoing configuration, the present invention achieves following effects.

The present invention accurately detects the rotation angle of the tool disc 20 through the angle sensor 57, such that the control terminal 58 accurately controls the brake structure 52, by which the motor 51 stops the rotation of the tool disc 20 at the appropriate time point, facilitating an efficient and accurate tool change operation.

The angle sensor 57 of the present invention is installed on one end of the driver shaft 54, so as to prevent the wearing of elements from affecting the detection accuracy of the rotation angle. Therefore, the detection accuracy of the angle sensor 57 is improved, and the installation of the present invention is simplified.

The angle sensor 57 is arranged at the rotation center of the tool disc 20, so as to prevent the wearing of elements on the power transmission path between the tool disc 20 and the cam 53 from affecting the detection accuracy of the rotation angle, thereby effectively improving the detection accuracy of the angle sensor 57.

With the brake structure 52 disposed in the motor 51, the present invention assures that the tool disc 20 stops rotating at an accurate position, preventing accidental rotation from occurring.

The present invention structurally achieves the control function similar to a servomotor, reducing the manufacturing and maintenance cost.

With each bearing 40 orderly operating along the outline 531 of the cam 53, the tool disc 20 is driven to continuously rotate without intermittence. Therefore, the smooth rotation of the tool disc 20 is assured, and the operation time is saved, thereby improving the efficiency of the tool change operation.

Although particular embodiments of the invention have been described in detail for purposes of illustration, various modifications and enhancements may be made without departing from the scope of the invention. Accordingly, the invention is not to be limited except as by the appended claims.

What is claimed is:

1. A tool machine magazine, comprising:
   a base;
   a tool disc disposed on the base;
   a plurality of tool sleeves disposed on a periphery of the tool disc, each of the plurality of tool sleeves for receiving a respective tool thereon;
   a plurality of bearings disposed on the tool disc in a circular arrangement, each bearing corresponding to one of the plurality of tool sleeves; and
   a driver device comprising a motor, a brake structure, a cam, a driver shaft, an angle sensor, and a control terminal, the brake structure disposed in the motor, the motor controlling the driver shaft to drive the cam to rotate about an axial direction of the driver shaft, each bearing respectively contacting an outline of the cam, each bearing orderly operating along the outline of the cam so as to drive the tool disc to continuously rotate without intermittence; the angle sensor disposed on one end of the driver shaft or a rotation center of the tool disc, the angle sensor sensing a rotation angle of the tool disc, and the control terminal receiving the rotation angle and a tool change command;
   the brake structure mounted around a rotation shaft of the motor; the brake structure comprising an electromagnetic set, a lining, a magnetic conductive plate, and a plurality of pressure springs; when the electromagnetic set is electrically conducted, the magnetic conductive plate is attracted by the electromagnetic set such that the magnetic conductive plate moves away from the lining, and the motor drives the cam to operate, and the magnetic conductive plate presses each pressure spring so that each pressure spring enters a compression status; when the electrical conduction of the electromagnetic set is cut, each pressure spring pushes the magnetic conductive plate to cause a friction between the magnetic conductive plate and the lining, and the rotation shaft of the motor is pressed by the lining to stop rotating, the brake structure comprising a bottom seat, a bushing, a plurality of studs, a plurality of pressure adjustment members, and a plurality of gap adjustment members; the bottom seat disposed along an axial direction of the motor; the magnetic conductive plate and the electromagnetic set being combined with the bottom seat through each stud; each pressure adjustment member and each gap adjustment member being screwedly disposed on a corresponding one of the plurality of studs and arranged between a corresponding one of the plurality of pressure springs and the electromagnetic set; the bushing being arranged between the lining and the rotation shaft of the motor, and the lining being slidably disposed on an outer edge of the bushing;

wherein when the control terminal identifies that the rotation angle matches the tool change command, the control terminal controls the brake structure to stop an operation of the motor, thereby stopping the tool disc from rotating for facilitating a tool change operation.

2. The tool machine magazine of claim 1, wherein the control terminal stores a relative position angle by which each tool sleeve is disposed on the tool disc; the tool change command represents the tool sleeve of a target tool; and the control terminal reads a corresponding relative position angle of the tool sleeve on which the target tool is placed and compares the read relative position angle with the received rotation angle.

3. The tool machine magazine of claim 1, wherein the driver device comprises a first gear and a second gear; the first gear is mounted around the rotation shaft of the motor; the second gear and the cam are mounted around the driver shaft; and the first gear is engaged with the second gear.

4. The tool machine magazine of claim 3, wherein the motor and the cam are disposed on the base.

5. The tool machine magazine of claim 1, wherein the angle sensor is an encoder.

6. The tool machine magazine of claim 1, wherein the angle sensor is an inductive sensor and comprises a sense block and a sense module; the sense block and the sense module are spaced; an outer periphery of the sense block is formed in an approximate arc shape curve; the sense module detects a distance with respect to the outer periphery of the sense block to generate a distance signal; and the control terminal receives the distance signal and processes the distance signal to acquire the rotation angle of the tool disc.

7. The tool machine magazine of claim 1, wherein the tool disc has a central shaft at the rotation center thereof; the tool disc is disposed on the base through the central shaft; and the plurality of bearings are disposed around the central shaft and are arranged between the corresponding tool sleeve and the central shaft.

8. The tool machine magazine of claim 1, wherein the cam is a column shaped constant-velocity cam; and the outline of the cam is formed on a periphery of the cam.

* * * * *